(12) United States Patent
Shang et al.

(10) Patent No.: US 11,244,393 B2
(45) Date of Patent: Feb. 8, 2022

(54) CREDIT BLOCKCHAIN SYSTEM, CREDIT DATA STORAGE METHOD, DEVICE, AND MEDIUM

(71) Applicant: Tencent Technology (Shenzhen) Company Limited, Shenzhen (CN)

(72) Inventors: Zhihao Shang, Shenzhen (CN); Hongfei Zhou, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/916,550

(22) Filed: Jun. 30, 2020

(65) Prior Publication Data

US 2020/0334749 A1    Oct. 22, 2020

Related U.S. Application Data

(63) Continuation of application No. PCT/CN2019/080013, filed on Mar. 28, 2019.

(30) Foreign Application Priority Data

Apr. 27, 2018   (CN) .......................... 201810395717.9

(51) Int. Cl.
*G06Q 40/02* (2012.01)
*H04L 9/06* (2006.01)
*H04L 29/08* (2006.01)

(52) U.S. Cl.
CPC ......... *G06Q 40/025* (2013.01); *H04L 9/0643* (2013.01); *H04L 67/306* (2013.01);
(Continued)

(58) Field of Classification Search
CPC .... G06Q 40/025; H04L 9/0643; H04L 67/306
See application file for complete search history.

(56) References Cited

U.S. PATENT DOCUMENTS 9,710,852 B1 * 7/2017 Olson .................. G06Q 40/025
9,805,123 B2 * 10/2017 Nair ........................ C12Q 1/25
(Continued)

FOREIGN PATENT DOCUMENTS

CN    106230808 A   12/2016
CN    106339875 A    1/2017
(Continued)

OTHER PUBLICATIONS

International Search Report and Written Opinion with English Translation for International Application No. PCT/CN2019/080013 dated Jul. 3, 2019; 12 pages.
(Continued)

*Primary Examiner* — Scott C Anderson
(74) *Attorney, Agent, or Firm* — Crowell & Moring LLP

(57) ABSTRACT

The present disclosure discloses a credit messaging system, a credit data storage method, a device, and a medium, and belongs to the field of network technologies. A server generates a unified user identifier based on user information of a user, generates, based on behavioral data of the user, credit data of the user through calculation by using a unified algorithm, and then, stores the credit data of the user and a corresponding user identifier into a block chain by using a target policy. In a block chain system, a unified user identifier is obtained for a same user, so that organizations in the block chain system may query credit data of the user according to the unified user identifier, thereby implementing high-quality data circulation and transactions while improving accuracy and comprehensiveness of queries for the credit data. In addition, credit data is generated according to a unified algorithm, thereby ensuring regulation of the credit data, and improving a reference value of the credit data of the organizations.

20 Claims, 4 Drawing Sheets

(52) U.S. Cl.
CPC ...... *G06Q 2220/10* (2013.01); *H04L 2209/38* (2013.01); *H04L 2209/56* (2013.01)

(56) References Cited

U.S. PATENT DOCUMENTS

| | | | |
|---|---|---|---|
| 2014/0337188 A1* | 11/2014 | Bennett | G06Q 20/102 |
| | | | 705/30 |
| 2017/0161439 A1* | 6/2017 | Raduchel | H04W 12/06 |
| 2017/0243214 A1 | 8/2017 | Johnsrud et al. | |
| 2017/0243287 A1* | 8/2017 | Johnsrud | G06Q 20/02 |
| 2018/0101914 A1 | 4/2018 | Samuel et al. | |
| 2018/0225640 A1* | 8/2018 | Chapman | G06Q 20/0855 |
| 2019/0160660 A1* | 5/2019 | Husain | H04L 9/0637 |

FOREIGN PATENT DOCUMENTS

| | | |
|---|---|---|
| CN | 106780007 A | 5/2017 |
| CN | 107767135 A | 3/2018 |
| CN | 108647962 A | 10/2018 |
| JP | 2019-522275 A | 8/2019 |
| WO | WO 2017/170679 A1 | 10/2017 |
| WO | WO 2017/205902 A1 | 12/2017 |

OTHER PUBLICATIONS

Office Action with English Translation of Notice of Reasons for Refusal for Japanese Patent Application No. 2020-549693 dated Sep. 9, 2021, 8 pages.

* cited by examiner

CREDIT BLOCKCHAIN SYSTEM, CREDIT DATA STORAGE METHOD, DEVICE, AND MEDIUM

RELATED APPLICATION

This application is a continuation application of the International PCT Application No. PCT/CN2019/080013, filed with the Chinese Patent Office on Mar. 28, 2019 which claims priority to Chinese Patent Application No. 2018103957179, entitled "CREDIT SYSTEM, CREDIT DATA STORAGE METHOD, APPARATUS, DEVICE, AND MEDIUM" and filed with the Chinese Patent Office on Apr. 27, 2018, which are incorporated herein by reference in their entireties.

FIELD OF THE TECHNOLOGY

The present disclosure relates to the field of network technologies, and in particular, to a system, a data storage method, a device, and a medium for credit messaging.

BACKGROUND OF THE DISCLOSURE

A credit messaging system is an important constituent part of a social credit system. A sound credit messaging system not only helps a financial institution to control the credit risk and facilitate risk warning analysis by a financial regulator, but also helps a judicial and other government entities to regulate the financial order and protect consumer benefits.

Currently, a credit messaging system is usually established by a single organization and the system only serves users of the organization. The organization may generate credit data for a user based on a credit behavior and the like of the user in the organization, and store the credit data in a credit messaging system of the organization, thereby providing a query service for the user and acting as a reference function for other services.

As each agency establishes its respective credit messaging system, there is no effective credit data sharing mechanism among organizations, also an information island problem is serious, and high-quality data circulation and transactions cannot be realized.

SUMMARY

Embodiments of this application provide a system, a credit data storage method, a device, and a medium for credit messaging, to provide effective data sharing. The technical solutions are as follows.

According to an aspect, a credit messaging system is provided, including a plurality of servers, the plurality of servers being servers of a plurality of organizations, each server being configured with a first block chain and a second block chain, the first block chain being configured to store user information of a user in each organization and a corresponding first user identifier, and the second block chain being configured to store credit data provided by the plurality of organizations; and any one of the plurality of servers being configured to perform the following operations:

obtaining, according to user information of a to-be-recorded user, a first user identifier of the user from the first block chain;

generating credit data of the first user identifier according to the user information of the user, newly-added behavioral data of the user, and historical credit data of the first user identifier stored on the second block chain;

transmitting the credit data of the first user identifier to a target node of the second block chain; and obtaining a target block in a case that a received response meets a target policy, and adding the target block in the second block chain, the target block being configured to store the credit data of the first user identifier.

According to an aspect, a credit data storage method is provided, including:

obtaining, according to user information of a to-be-recorded user, a first user identifier of the user from a first block chain, the first block chain being configured to store user information of a user in each organization and a corresponding first user identifier;

generating credit data of the first user identifier according to the user information of the user, newly-added behavioral data of the user, and historical credit data of the first user identifier stored on a second block chain;

transmitting the credit data of the first user identifier to a target node of the second block chain;

obtaining a target block in a case that a received response meets a target policy, the target block being configured to store the credit data of the first user identifier; and adding the target block in the second block chain.

According to an aspect, a credit data storage apparatus is provided, including:

a user identifier obtaining module, configured to obtain, according to user information of a to-be-recorded user, a first user identifier of the user from a first block chain, the first block chain being configured to store user information of a user in each organization and a corresponding first user identifier;

a generation module, configured to generate credit data of the first user identifier according to the user information of the user, newly-added behavioral data of the user, and historical credit data of the first user identifier stored on a second block chain;

a transmitting module, configured to transmit the credit data of the first user identifier to a target node of the second block chain;

a target block obtaining module, configured to obtain a target block in a case that a received response meets a target policy, the target block being configured to store the credit data of the first user identifier; and an adding module, configured to add the target block in the second block chain.

According to an aspect, a computer device is provided, including a memory and a processor in communication with the memory, the memory storing at least one instruction, the instruction being loaded and executed by the processor to implement the operations performed in the foregoing credit data storage method.

According to an aspect, a computer-readable storage medium is provided, the storage medium storing at least one instruction, the instruction being loaded and executed by a processor to implement the operations performed in the foregoing credit data storage method.

The technical solutions provided in the embodiments of this application have the following beneficial effects:

A server generates a unified user identifier based on user information of a user, generates, based on behavioral data of the user, credit data of the user through calculation by using a unified algorithm, and then, stores the credit data of the user and a corresponding user identifier into a block chain by using a target policy. In a block chain system, a unified user identifier is obtained for a same user, so that different organizations in the block chain system may query credit data of the user according to the unified user identifier, thereby implementing high-quality data circulation and transactions while improving accuracy and comprehensiveness of queries for the credit data. In addition, credit data is generated according to a unified algorithm, thereby ensuring regulation of the credit data, and improving the reference value of the credit data of the organizations.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of the present disclosure, and a person of ordinary skill in the art may still derive other drawings from the accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
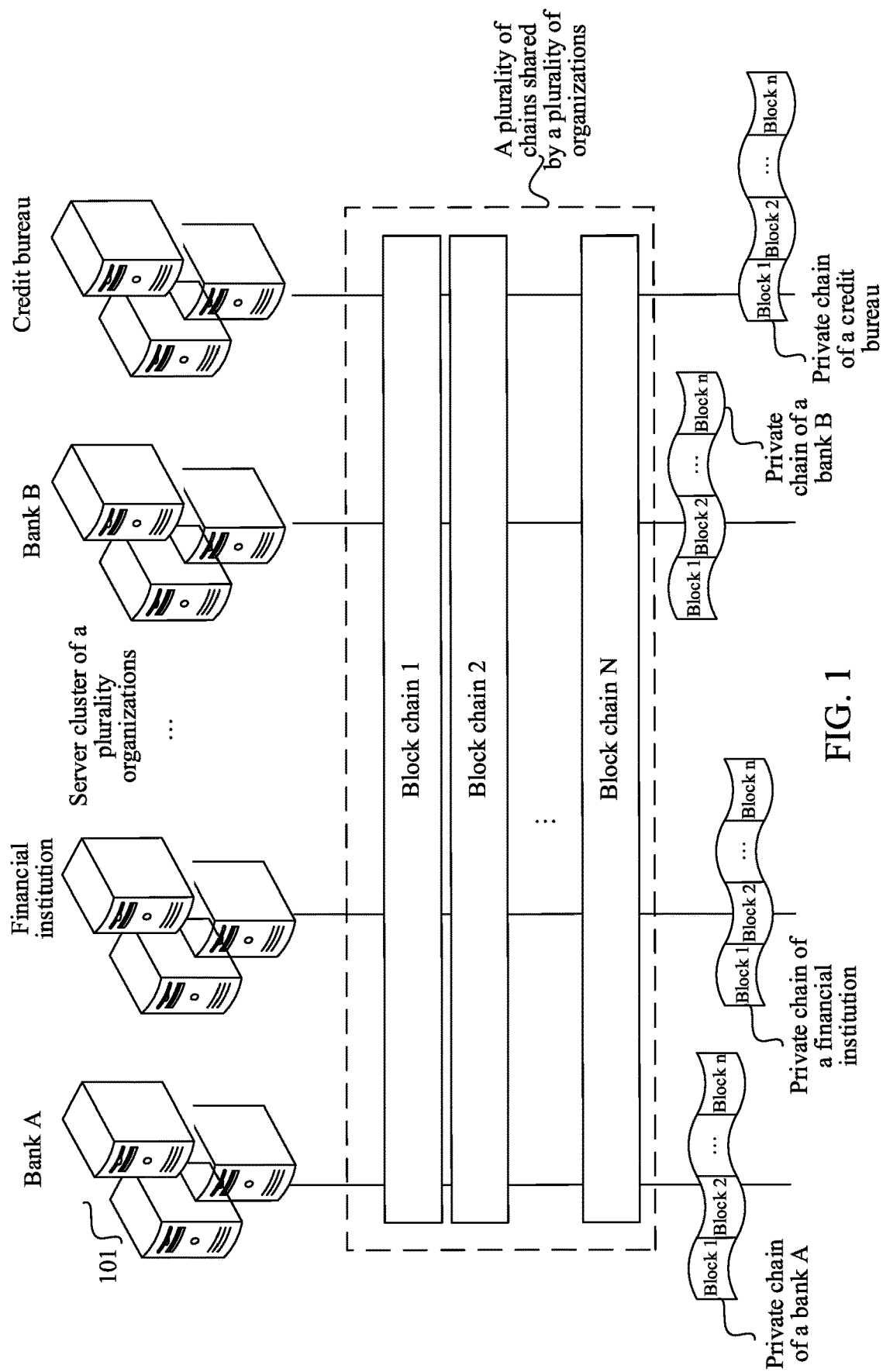
FIG. 1 is a systematic structural diagram of a credit messaging system according to an embodiment of this application.

FIG. 1 is a systematic structural diagram of a credit messaging system according to an embodiment of this application. An implementation environment includes a plurality of servers 101, and the plurality of servers 101 are servers of a plurality of organizations. The server 101 may belong to any organization, for example, a bank, a financial institution, a credit agency, a credit bureau, or a consumer organization. A plurality of block chains sharable by respective organizations, for example, a first block chain configured to store user information of a user in each organization and a corresponding first user identifier, and a second block chain configured to query credit data, may be deployed on each of the plurality of servers 101. Additionally, to further implement functions such as querying behavioral data of a user, a third block chain may be further deployed on each of the plurality of servers. Newly-added behavioral data is obtained by performing data masking on behavioral information of the user. The server is further configured to store the newly-added behavioral data of the user in the third block chain. The third block chain is configured to store behavioral data corresponding to a first user identifier of the user in each organization.

To ensure data security and privacy, a respective private chain, for example a fourth block chain, may be further deployed on each server, to store user behavioral data of an organization corresponding to the server. Correspondingly, the server is further configured to store behavioral information of the user and a second user identifier of the user in a fourth block chain, the fourth block chain being configured to store behavioral information of the user on the server.

Each server is further configured to obtain a first query request, the first query request carrying the first user identifier of the user and an organization identifier of an organization initiating the query; and obtain the credit data of the user from the second block chain according to the first user identifier of the user if the organization has a query permission.

Each server is further configured to correspondingly store the behavioral information of the user and the second user identifier of the user in the fourth block chain, the fourth block chain being configured to store the behavioral information of the user on the server.

The foregoing servers may all be provided as any type of computer device. No specific limitation is imposed in the embodiments of this application.

Some terms that appear in the following specific description are described below:

An alliance chain, also referred to as a consortium block chain, refers to a block chain where the consensus process is controlled by a set of preselected nodes. In the alliance chain, all or some functions are opened to only node members in the chain, and each block chain node in the alliance chain may customize a read/write permission, a query permission, and the like based on requirements. For example, the first block chain, the second block chain, and the third block chain each may be an alliance chain.

An intelligent contract, a contract program executed automatically according to a specific condition, is an important channel through which a user interacts with a block chain and through which business logic is implemented by using the block chain. For example, each organization may access the credit messaging system by using an intelligent contract on a block chain deployed in a server.

A target policy may be one of consensus polices, for example, an endorsement policy that may be used for indicating a necessary condition for an endorsement process in a data storage system. For example, the endorsement policy may instruct a plurality of endorsement nodes that need endorsement to form an endorsement node set. An endorsement process requires joint signatures of nodes in the endorsement node set.

Figure 2:
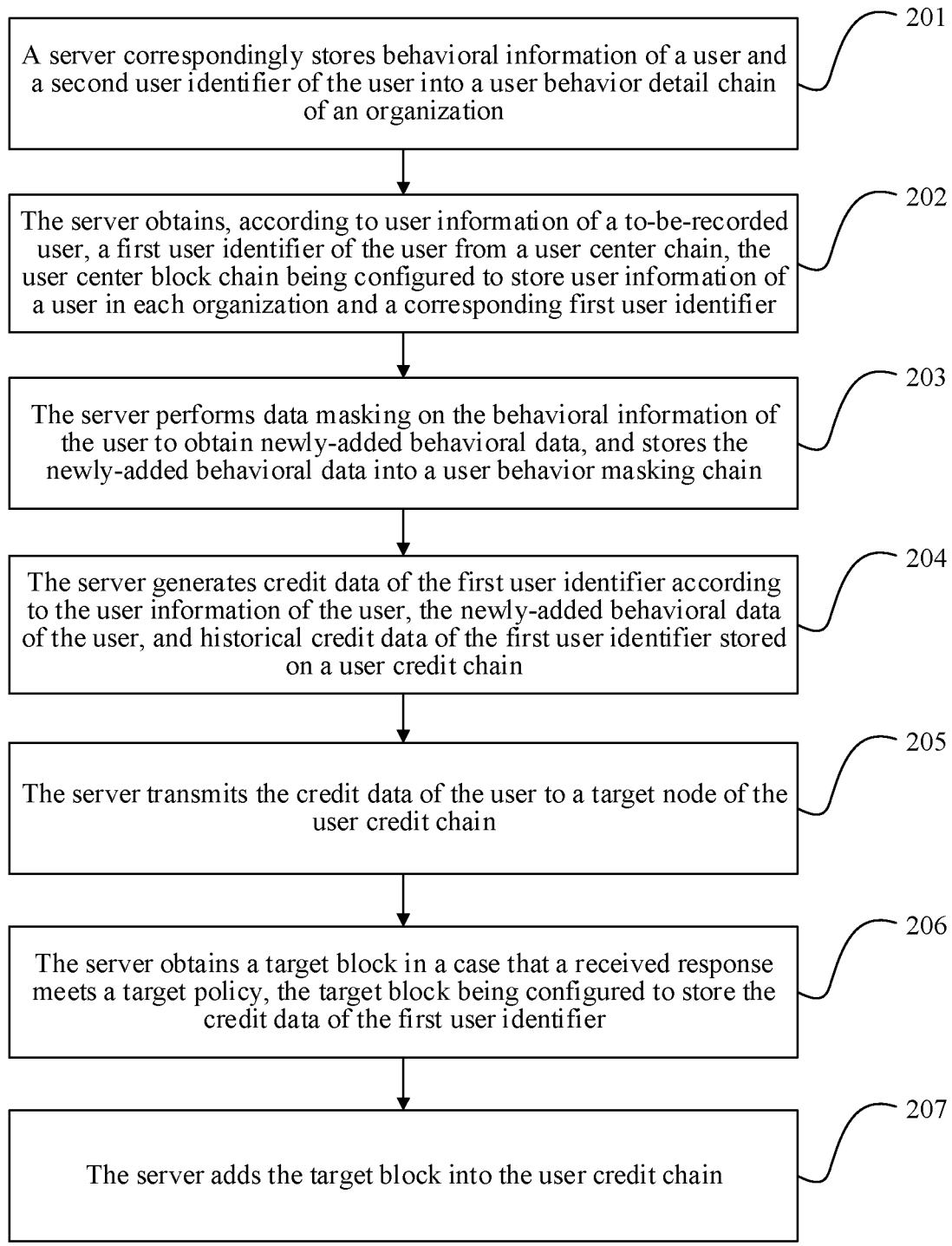
FIG. 2 is a flowchart of a credit data storage method according to an embodiment of this application.

FIG. 2 is a flowchart of a credit data storage method according to an embodiment of this application. The method may be applied to the implementation environment provided in FIG. 1, and the server may be a server of any organization. Referring to FIG. 2, the method includes the following steps:

201. A server correspondingly stores behavioral information of a user and a second user identifier of the user into a user behavior detail chain of the organization.

In this embodiment of this application, the user behavior detail chain which may be the foregoing fourth block chain, may be a private chain of the organization and only configured on a server of the organization. In this case, data stored in the user behavior detail chain cannot be obtained by other organizations. The wording "cannot be obtained by other organizations" may mean that data is stored in any of the following manners. For example, in a possible implementation, after obtaining to-be-stored behavioral information, the server encrypts the behavioral information by using a specific secret key, and then stores the encrypted behavioral information in the user behavior detail chain, the secret key being owned by a user of the organization or an administrative user of the organization only. Alternatively, the server may store the user behavior detail chain into a storage space with a specific access permission, and when any user intends to access the storage space, access is only granted when verification of the access is successful.

The behavioral information of the user is used for indicating business activities between the user and the organization. For example, if the organization is a bank, the behavioral information of the user may be, for example, the user performs consumption transactions based on an account in the bank, borrows from the bank, or pay a loan to the bank. No specific limitation is imposed in the embodiments of this application.

The second user identifier of the user may be a user identifier obtained after user information is encrypted. The user information of the user may be basic information such as the name, gender, age, identity card number, and mobile phone number of the user. No specific limitation is imposed in the embodiments of this application.

In this embodiment of this application, when obtaining behavioral information of a user in the organization, a server may store the behavioral information of the user and a second user identifier of the user into a user behavior detail chain in the organization. The behavioral information of the user is stored in a private chain of the organization, to facilitate the user or the organization querying the behavioral information while preventing other organizations from obtaining the behavioral information, thereby protecting rights of the organization from being infringed. In addition, when the behavioral information of the user is stored, the corresponding second user identifier is stored after the encryption, so that the user information of the user can be prevented from being leaked, thus protecting user privacy and user rights.

Alternatively, the organization may form a credit messaging system together with a plurality of other organizations. A server in each organization in the credit messaging system may be equipped with a plurality of same block chains, and the plurality of same block chains are alliance chains of the plurality of organizations and configured to store credit data of a user. The plurality of organizations may store and query the credit data of the user in the alliance chains, to implement credit data sharing.

202. The server obtains, according to user information of a to-be-recorded user, a first user identifier of the user from a user center chain, the user center chain being configured to store user information of a user in each organization and a corresponding first user identifier.

In this embodiment of this application, the user center chain, which may be the foregoing first block chain, may be configured to provide a unified user identifier for a plurality of organizations, so that the organizations can find all credit data of the user in the credit messaging system by using the same identifier. The first user identifier is used for uniquely representing the user in the alliance chains of the plurality of organizations, and the first user identifier may be generated according to the user information of the user by using a first intelligent contract algorithm in the user center chain.

In this embodiment of this application, when obtaining behavioral information of a user in the organization, a server may update credit data of the user in the credit messaging system according to the behavioral information. Before updating the credit data, the server needs to obtain a first user identifier of the user in the credit messaging system, so that subsequent storage and queries for the credit data of the user can be facilitated.

Optionally, a method for obtaining the first user identifier of the user is: performing, by a server, matching in a first block chain according to user information of the user, if a user identifier corresponding to the user information is matched, using the matched user identifier as the first user identifier of the user. On the other hand, if no user identifier corresponding to the user information is matched in the first block chain according to the user information of the user, the first user identifier of the user is generated based on the user information of the user.

The server may further generate profile data of the user according to the user information and behavioral data of the user, and store the profile data of the user in the first block chain. The profile data may include the age, gender, region, income or investment, social network information and the like of the user. The profile data of the user is generated and stored, so that the characteristics of the user may be recorded more stereoscopically in the credit messaging system.

203. The server performs data masking on behavioral information of the user to obtain newly-added behavioral data, and stores the newly-added behavioral data into a user behavior masking chain.

In this embodiment of this application, the user behavior masking chain, which may be the foregoing third block chain, may be configured to store behavioral information after the removal of sensitive information, to avoid leaking user privacy when the behavioral information is queried.

In this embodiment of this application, when obtaining behavioral information of a user in the organization, a server may further perform masking on the behavioral information to remove data related to the privacy of the user from the behavioral information. For example, when the organization is a bank, the behavioral information is behavioral information about that a user performs consumption transactions based on an account in the bank, and performing masking on the behavioral information may include: removing information, such as a specific amount of consumption, information of a charging party, or a consumption place, from the behavioral information. The masking policy may be preset and then adjusted as needed. No specific limitation is imposed in the embodiments of this application.

In a possible implementation, the performing masking on the behavioral information may include: identifying target sensitive data in the behavioral information, and deleting the target sensitive data from the behavioral information to obtain behavioral information after removal of sensitive information. The target sensitive data belongs to a target data item. The target data item refers to a data item that can reflect privacy information of a user, for example, a specific amount of consumption, information of a charging party, or a consumption place.

After performing masking on the behavioral information, the server may generate newly-added behavioral data of the user based on the behavioral information after the removal of sensitive information, and store the newly-added behavioral data of the user into a user behavior masking chain. The user behavior masking chain may be an alliance chain configured in servers of a plurality of organizations in the credit messaging system and configured to store the behavioral data corresponding to the first user identifier of the user in the respective organizations.

Furthermore, the newly-added behavioral data may be converted data satisfying a unified standard and may include the first user identifier of the user, a positive behavior or a negative behavior, normalized data, a time at which the behavioral information is generated, and the like. The positive behavior or the negative behavior is used for indicating the behavioral information. The positive behavior may include payment on time, highly frequent consumption, large consumption, or the like. And the negative behavior may include overdue payment or the like. No specific limitation is imposed in the embodiments of this application. The normalized data is used for indicating data that is generated by calculating the behavioral information by using a unified algorithm and is limited within a specific range. For example, the behavioral information may be calculated into any number between 0 and 1. Normalizing the behavioral information can quantify the behavioral information. When querying the newly-added behavioral data, a user or an organization may intuitively evaluate the present behavioral information according to the normalized data.

Furthermore, before storing the newly-added behavioral data in the user behavior masking chain, the server may sign the newly-added behavioral data with a private key of an organization to indicate that the newly-added behavioral data is generated by the organization. Optionally, a user generating the behavioral information may further sign the newly-added behavioral data according to a private key of the user to indicate that the newly-added behavioral data is confirmed by the user. In this case, a format of the newly-added behavioral data may be shown in Table 1:

TABLE 1

| First user identifier | Positive behavior or negative behavior | Normalized data | Time of generating behavioral information | User signature | Organization signature |
| --- | --- | --- | --- | --- | --- |

204. The server generates credit data of the first user identifier according to the user information of the user, newly-added behavioral data of the user, and historical credit data of the first user identifier stored on a user credit chain.

In this embodiment of this application, the user credit chain, which may be the foregoing second block chain, may be configured to store the credit data. After generating the newly-added behavioral data according to behavioral information of the user, the server may further generate the credit data of the first user identifier corresponding to the user information according to the newly-added behavioral data. A specific process of generating the credit data includes the following sub-step 1 to sub-step 3.

Sub-step 1. The server obtains the first user identifier of the user according to the user information of the user.

After generating the newly-added behavioral data according to the behavioral information of a user, the server may obtain the first user identifier according to a correspondence between the user information of the user and the first user identifier of the user stored in a user center chain.

Sub-step 2. The server obtains the historical credit data of the first user identifier from the user credit chain according to the first user identifier.

After obtaining the first user identifier of the user, the server obtains the historical credit data corresponding to the first user identifier from the user credit chain according to the first user identifier. The historical credit data includes positive feedback data and negative feedback data of the user. The positive feedback data is used for indicating behavioral information that may improve credit data of the user, that is, behavioral information that has positive impact on a credit status of the user. For example, payment on time, highly frequent consumption, or large consumption. The negative feedback data is used for indicating behavioral information degrading credit data of the user, that is, behavioral information that has negative impact on a credit status of the user, for example, overdue payment. No specific limitation is imposed in the embodiments of this application.

Sub-step 3. The server generates the credit data of the first user identifier according to the user information of the user, the newly-added behavioral data of the user, and positive feedback data and negative feedback data in the historical credit data of the first user identifier stored on the user credit chain.

After obtaining the positive feedback data and the negative feedback data in the historical credit data corresponding to the first user identifier, the server of an organization calculates new credit data of the user by using a unified algorithm in a second intelligent contract in the user credit chain with reference to the newly-added behavioral data. After generating newly-added behavioral data, servers of different organizations may all generate credit data based on the second intelligent contract on the user credit chain. Therefore, the servers adopt a unified calculation manner for the credit data and a unified evaluation standard for a credit status, and can achieve effective data sharing, so that the credit data obtained by any organization subsequently can represent the same credit status based on the same standard, thereby improving a reference value of the credit data.

205. The server transmits the credit data of the user to a target node of the user credit chain.

A server of an organization may further transmit, according to a target policy in the second intelligent contract in the second block chain, the newly-added behavioral data, the obtained historical credit data, and the new credit data obtained through the calculation to a plurality of target nodes (that is, a plurality of servers) for consensus. When credit data generated by the plurality of target nodes according to the unified algorithm in the second intelligent contract is the same as the new credit data, signed data is returned to the server of the organization. The specific consensus process may be implemented in other manners and no limitation is imposed in the embodiments of this application. The plurality of target nodes may be some nodes specified by the target policy and may be nodes on which user credit chains are configured. No limitation is imposed in the embodiments of this application.

206. The server obtains a target block in a case that a received response meets a target policy, the target block being configured to store the credit data of the first user identifier.

When the received response meets the target policy in the second intelligent contract of the user credit chain, the server may generate the target block according to the new credit data. In this case, a plurality of nodes on the user credit chain reach a consensus, and data may enter the chain.

207. The server adds the target block in the user credit chain.

After generating a target block, a server of an organization may add the target block in the user credit chain, to implement credit data sharing.

The foregoing processes of generating the block and adding the block in the chain may alternatively be completed by other nodes, and the server may only serve as a node for receiving and storing the target block. Details of the specific interaction process are not described herein.

In the credit data storage method according to this embodiment of this application, a server generates a unified user identifier based on user information of a user, generates, based on behavioral data of the user, credit data of the user through calculation by using a unified algorithm, and then, stores the credit data of the user and a corresponding user identifier into a block chain by using a target policy. In a block chain system, a unified user identifier is obtained for a same user, so that organizations in the block chain system may query credit data of the user according to the unified user identifier, thereby implementing high-quality data sharing, circulation, and transactions while improving accuracy and comprehensiveness of queries for the credit data. In addition, credit data is generated according to a unified algorithm, thereby ensuring regulation of the credit data, and improving a reference value of the credit data of the organizations.

A server of an organization in a credit messaging system may further query credit data in a block chain, and a specific process of querying credit data includes the following sub-step 1 and sub-step 2.

Sub-step 1. The server of the organization obtains a first query request, the first query request carrying the first user identifier of the user and an organization identifier of an organization initiating a query.

Sub-step 2. Obtain credit data of the user from the user credit chain according to the first user identifier of the user if the organization has a query permission.

Furthermore, when generating the credit data of the user according to the behavioral information of the user and storing the credit data in the user credit chain, the server of the organization may further obtain, according to the storage process, a permission of querying other credit data in the user credit chain, and store the permission into a fifth block chain, and the fifth block chain may be an organization query detail chain. For example, after storing the credit data in the block chain, the server of the organization may be awarded a query point (also referred to as a query score), and store the query point in the fifth block chain. For example, when credit data in the second block chain is queried, a query point of the organization in the fifth block chain may first be obtained, and a query is performed based on the query point. When a point required for querying for credit data is less than the query point of the organization, the organization has enough query point and the credit data may be queried for. Otherwise, when a point required for querying for credit data is greater than the query point of the organization, the organization does not have a query permission and cannot query the credit data. Optionally, different query points may be alternatively generated according to different credit data.

Furthermore, a server of an organization may further query behavioral information of a user generated in the organization, and a specific process of querying the behavioral information includes the following sub-step 1 and sub-step 2.

Sub-step 1. The server obtains a second query request, the second query request carrying a second user identifier of a user in the organization; and Sub-step 2. Obtain the behavioral information corresponding to the second user identifier from the user behavior detail chain according to the second user identifier.

The query point is generated according to a process of storing the credit data, and the credit data is queried based on the query point. The storage process is used as a reward mechanism of querying the credit data, so that enthusiasm of a plurality of organizations in a credit messaging system in storing credit data into a block chain is increased, and the credit data in the credit messaging system is more comprehensive.

Figure 3:
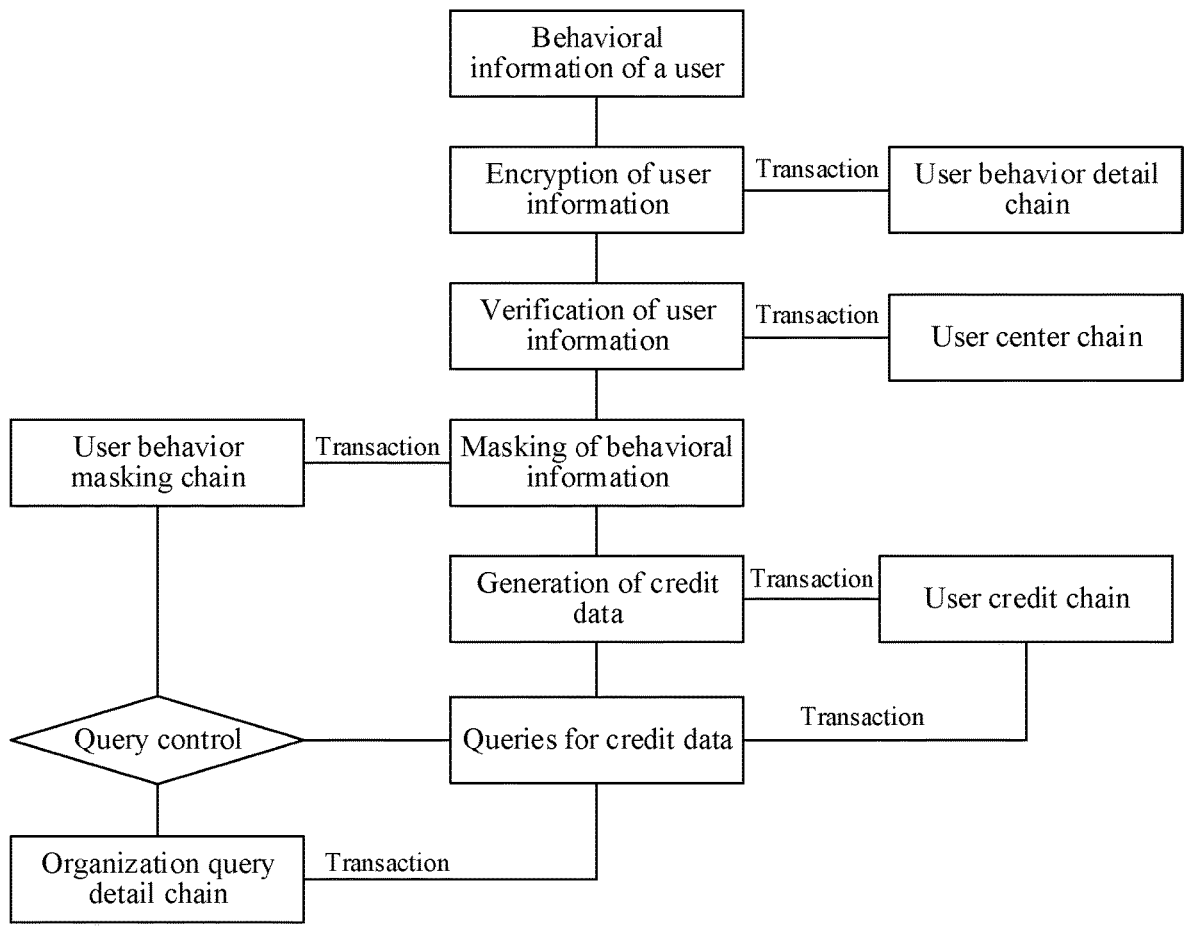
FIG. 3 is a flowchart of storing and querying credit data according to an embodiment of this application.

The foregoing processes, such as storage, generation, and query, may actually be completed by using a plurality of block chains in a credit messaging system. Referring to FIG. 3, internal user behavioral information of an organization is stored by using a user behavior detail chain, and a unified user identifier is provided by a user center chain, so that related data of a user can be queried by using one same user identifier inside an entire credit messaging system. In addition, a credit data expression or definition manner shared by a plurality of organizations is provided by using a unified credit algorithm provided on a user credit chain. Furthermore, a user behavior masking chain on which behavioral information of a user can be queried and masked date is stored to ensure user privacy. Moreover, an organization query detail chain is further provided to manage a query permission of an organization. In the entire process, credit data sharing between a plurality of organizations can be provided while ensuring security and privacy of data, thereby implementing high-quality data circulation and transactions.

Figure 4:
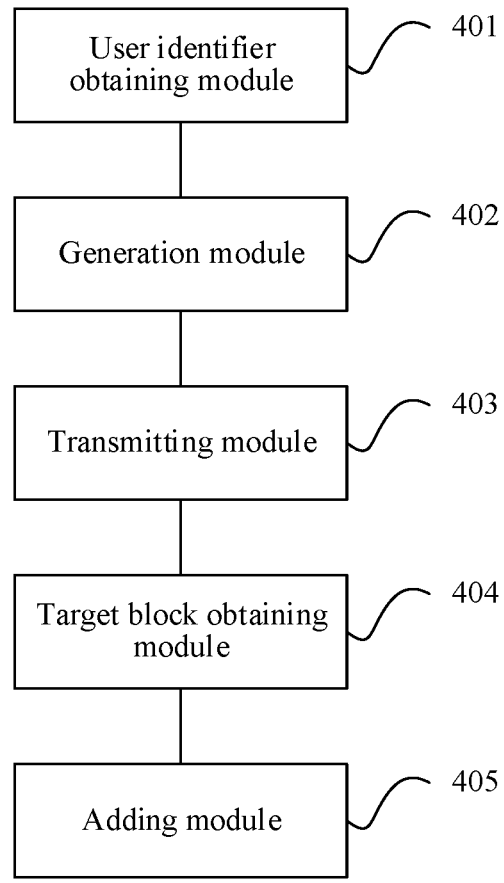
FIG. 4 is a schematic structural diagram of a credit data storage apparatus according to an embodiment of this application.

FIG. 4 is a schematic structural diagram of a credit data storage apparatus according to an embodiment of this application. Referring to FIG. 4, the apparatus includes:

a user identifier obtaining module 401, configured to obtain, according to user information of a to-be-recorded user, a first user identifier of the user from a first block chain, the first block chain being configured to store user information of a user in each organization and a corresponding first user identifier;

a generation module 402, configured to generate credit data of the first user identifier according to the user information of the user, newly-added behavioral data of the user, and historical credit data of the first user identifier stored on a second block chain;

a transmitting module 403, configured to transmit the credit data of the user to a target node of the second block chain; and a target block obtaining module 404, configured obtain a target block in a case that a received response meets a target policy, the target block being configured to store the credit data of the first user identifier; and an adding module 405, configured to add the target block in the second block chain.

In the credit data storage apparatus according to this embodiment of this application, a server generates a unified user identifier based on user information of a user, generates, based on behavioral data of the user, credit data of the user through calculation by using a unified algorithm, and then, stores the credit data of the user and a corresponding user identifier into a block chain by using a target policy. In a block chain system, a unified user identifier is obtained for a same user, so that organizations in the block chain system may query credit data of the user according to the unified user identifier, thereby implementing high-quality data circulation and transactions while improving accuracy and comprehensiveness of queries for the credit data. In addition, credit data is generated according to a unified algorithm, thereby ensuring regulation of the credit data, and improving a reference value of the credit data of the organizations.

In a possible implementation, the user identifier obtaining module 401 is configured to:

use, if a user identifier corresponding to the user information is matched in the first block chain according to the user information of the user, the matched user identifier as the first user identifier of the user; or generate the first user identifier of the user based on the user information of the user if no user identifier corresponding to the user information is matched in the first block chain according to the user information of the user.

In a possible implementation, the apparatus further includes:

a third block chain storage module, configured to store newly-added behavioral data of the user in a third block chain, the third block chain being configured to store the behavioral data corresponding to the first user identifier of the user in each organization.

Any combination of the foregoing optional technical solutions may be used to form an optional embodiment of the present disclosure. Details are not described herein.

Figure 5:
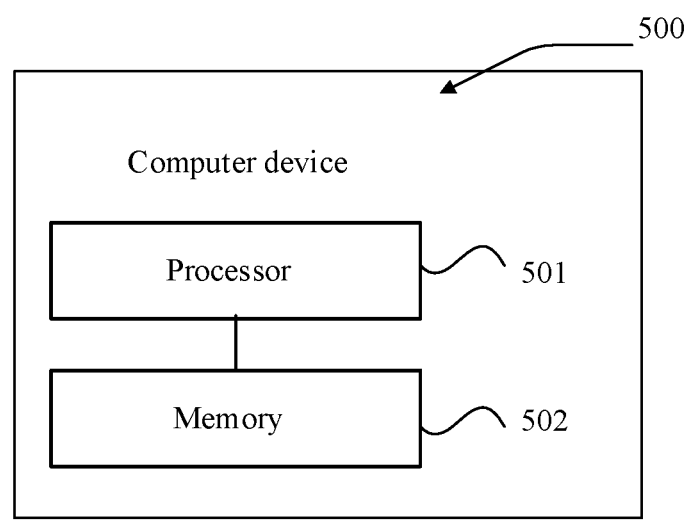
FIG. 5 is a schematic diagram of a computer device according to an embodiment of this application.

FIG. 5 is a schematic diagram of a computer device 500 according to an embodiment of this application. The computer device 500 may vary due to different configurations or performance, and may include one or more processors 501 and one or more memories 502. The memory 502 stores at least one instruction, the at least one instruction being loaded and executed by the processor 501 to implement the credit data storage method provided by the foregoing method embodiments. The computer device may further include components such as a wired or wireless network interface, a keyboard, and an input/output interface, to facilitate input/output. The computer device may further include another component configured to implement functions of a device, and details are not described herein again.

The credit data storage method includes: obtaining, according to user information of a to-be-recorded user, a first user identifier of the user from a first block chain, the first block chain being configured to store user information of a user in each organization and a corresponding first user identifier; generating credit data of the first user identifier according to the user information of the user, newly-added behavioral data of the user, and historical credit data of the first user identifier stored on a second block chain, the second block chain being configured to store credit data provided by the plurality of organizations; transmitting the credit data of the first user identifier to a target node of the second block chain, obtaining a target block in a case that a received response meets a target policy, the target block being configured to store the credit data of the first user identifier; and adding the target block in the second block chain.

In a possible implementation, the processor is configured to perform the following step:
using, if a user identifier corresponding to the user information is matched in the first block chain according to the user information of the user, the matched user identifier as the first user identifier of the user; or
generating the first user identifier of the user based on the user information of the user if no user identifier corresponding to the user information is matched in the first block chain according to the user information of the user.

In a possible implementation, the newly-added behavioral data is obtained by performing data masking on behavioral information of the user; and
the method further includes:
storing the newly-added behavioral data of the user in a third block chain, the third block chain being configured to store the behavioral data corresponding to the first user identifier of the user in each organization.

In a possible implementation, the processor is configured to perform the following steps:
obtaining the historical credit data of the first user identifier from the second block chain according to the first user identifier; and
generating the credit data of the first user identifier according to the user information of the user, the newly-added behavioral data of the user, and positive feedback data and negative feedback data in the historical credit data of the first user identifier stored on the second block chain.

In a possible implementation, the processor is further configured to perform the following steps:

obtaining a first query request, the first query request carrying the first user identifier of the user and an organization identifier of an organization initiating a query; and
obtaining the credit data of the first user identifier from the second block chain according to the first user identifier of the user if the organization has a query permission.

In a possible implementation, the processor is further configured to perform the following steps:
correspondingly storing behavioral information of the user and a second user identifier of the user in a fourth block chain, the fourth block chain being configured to store behavioral information of the user on the server.

In an exemplary embodiment, a computer-readable storage medium such as a memory including an instruction, is further provided. The foregoing instruction may be executed by a processor in a terminal to implement the credit data storage method in the foregoing embodiments. For example, the computer-readable storage medium may be a read-only memory (ROM), a random access memory (RAM), a CD-ROM, a magnetic tape, a floppy disk, or an optical data storage device.

A person of ordinary skill in the art may understand that all or some of steps of the embodiments may be implemented by hardware or a program instructing related hardware. The program may be stored in a computer-readable storage medium. The storage medium may be a ROM, a magnetic disk or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A system for credit messaging, comprising a plurality of servers for a plurality of organizations, each server being configured with a first block chain and a second block chain, the first block chain being configured to store user information of users in each organization and corresponding first user identifiers, and the second block chain being configured to store credit data provided by the plurality of organizations, and any one of the plurality of servers being configured to perform the following operations:
obtaining, according to user information of a user, a first user identifier of the user from the first block chain, wherein the first user identifier is a unified identifier that uniquely identifies the user across the plurality of organizations;
encrypting newly-added behavioral data of the user based on a secret key;
storing the encrypted newly-added behavioral data of the user to a private block chain;
generating credit data of the first user identifier according to the user information of the user, newly-added behavioral data of the user, and historical credit data of the first user identifier stored on the second block chain;
transmitting the credit data of the first user identifier to a target node of the second block chain;
obtaining a target block in a case that a received response meets a target policy, and adding the target block to the second block chain, the target block being configured to store the credit data of the first user identifier; and
in response to the target block being added to the second block chain, awarding n query points to an organization associated with the any one of the plurality of servers belongs, wherein the n query points are used for a future credit query in the system, n is a positive integer based on the credit data.

2. The system according to claim 1, wherein the plurality of servers are further configured with a third block chain;
the newly-added behavioral data is obtained by performing data masking on behavioral information of the user; and
each server is further configured to store the newly-added behavioral data of the user in the third block chain, the third block chain being configured to store behavioral data corresponding to the first user identifier of the user in each organization.

3. The system according to claim 1, wherein:
the plurality of servers are further configured with a fourth block chain; and
behavioral information of the user and a second user identifier of the user are correspondingly stored in the fourth block chain, the fourth block chain being configured to store behavioral information of the user on each server.

4. The system according to claim 1, wherein each server is further configured to obtain a first query request, the first query request carrying the first user identifier of the user and an organization identifier of an organization initiating a query; and obtain the credit data of the first user identifier from the second block chain according to the first user identifier of the user if the organization has a query permission.

5. The system according to claim 1, wherein each server is further configured to correspondingly store behavioral information of the user and a second user identifier of the user into a fourth block chain, the fourth block chain being configured to store behavioral information of the user on each server.

6. A credit data storage method, comprising:
obtaining, according to user information of a user, a first user identifier of the user from a first block chain, the first block chain being configured to store user information of a user and a corresponding first user identifier, wherein the user is in one organization of a plurality of organizations, and the first user identifier uniquely identifies the user across the plurality of organizations;
encrypting newly-added behavioral data of the user based on a secret key;
storing the encrypted newly-added behavioral data of the user to a private block chain;
generating credit data of the first user identifier according to the user information of the user, newly-added behavioral data of the user, and historical credit data of the first user identifier stored on a second block chain, the second block chain being configured to store credit data provided by a plurality of organizations;
transmitting the credit data of the first user identifier to a target node of the second block chain;
obtaining a target block in a case that a received response meets a target policy, the target block being configured to store the credit data of the first user identifier;
adding the target block in the second block chain; and
awarding n query points to the one organization, wherein the n query points are used for a future credit query, n is a positive integer based on the credit data.

7. The method according to claim 6, wherein obtaining, according to the user information of the user, the first user identifier of the user from a first block chain comprises:
using, in a case that a user identifier corresponding to the user information is matched in the first block chain according to the user information of the user, the matched user identifier as the first user identifier of the user; or
generating the first user identifier of the user based on the user information of the user in a case that no user identifier corresponding to the user information is matched in the first block chain according to the user information of the user.

8. The method according to claim 6, wherein:
the newly-added behavioral data is obtained by performing data masking on behavioral information of the user; and
the method further comprises storing the newly-added behavioral data of the user into a third block chain, the third block chain being configured to store behavioral data corresponding to the first user identifier of the user in each organization.

9. The method according to claim 6, wherein generating the credit data of the first user identifier according to the user information of the user, the newly-added behavioral data of the user, and the historical credit data of the first user identifier stored on a second block chain comprises:
obtaining the historical credit data of the first user identifier from the second block chain according to the first user identifier; and
generating the credit data of the first user identifier according to the user information of the user, the newly-added behavioral data of the user, and positive feedback data and negative feedback data in the historical credit data of the first user identifier stored on the second block chain.

10. The method according to claim 6, wherein the method further comprises:
obtaining a first query request, the first query request carrying the first user identifier of the user and an organization identifier of an organization initiating the first query request; and
obtaining the credit data of the first user identifier from the second block chain according to the first user identifier of the user if the organization is determined to have a query permission.

11. The method according to claim 6, wherein before the obtaining, according to the user information of the user, the first user identifier of the user from the first block chain, the method further comprises:
correspondingly storing behavioral information of the user and a second user identifier of the user into a fourth block chain, the fourth block chain being configured to store behavioral information of the user on each server.

12. The method according to claim 11, wherein the method further comprises:
obtaining a first query request, the first query request carrying the second user identifier of the user in the organization; and
obtaining the behavioral information corresponding to the second user identifier from the fourth block chain according to the second user identifier.

13. A computer device to implement credit data storage method, comprising a memory for storing computer readable instructions and a processor in communication with the memory, wherein the processor is configured to execute the computer readable instructions to cause the computer device to:
obtain, according to user information of a user, a first user identifier of the user from a first block chain, the first block chain being configured to store user information of a user and a corresponding first user identifier, wherein the user is in one organization of a plurality of organizations, and the first user identifier uniquely identifies the user across the plurality of organizations;

encrypt newly-added behavioral data of the user based on a secret key;

store the encrypted newly-added behavioral data of the user to a private block chain;

generate credit data of the first user identifier according to the user information of the user, newly-added behavioral data of the user, and historical credit data of the first user identifier stored on a second block chain, the second block chain being configured to store credit data provided by a plurality of organizations;

transmit the credit data of the first user identifier to a target node of the second block chain;

obtain a target block in a case that a received response meets a target policy, the target block being configured to store the credit data of the first user identifier;

add the target block in the second block chain; and award n query points to the one organization, wherein the n query points are used for a future credit query, n is a positive integer based on the credit data.

14. The computer device according to claim 13, wherein the processor, when executing the computer readable instructions, is further configured to cause the computer device to:

use, in a case that a user identifier corresponding to the user information is matched in the first block chain according to the user information of the user, the matched user identifier as the first user identifier of the user; or generate the first user identifier of the user based on the user information of the user in a case that no user identifier corresponding to the user information is matched in the first block chain according to the user information of the user.

15. The computer device according to claim 13, wherein the newly-added behavioral data is obtained by performing data masking on behavioral information of the user; wherein the processor, when executing the computer readable instructions, is further configured to cause the computer device to:

store the newly-added behavioral data of the user into a third block chain, the third block chain being configured to store behavioral data corresponding to the first user identifier of the user in each organization.

16. The computer device according to claim 13, wherein the processor, when executing the computer readable instructions, is further configured to cause the computer device to:

obtain the historical credit data of the first user identifier from the second block chain according to the first user identifier; and generate the credit data of the first user identifier according to the user information of the user, the newly-added behavioral data of the user, and positive feedback data and negative feedback data in the historical credit data of the first user identifier stored on the second block chain.

17. The computer device according to claim 13, wherein the processor, when executing the computer readable instructions, is further configured to cause the computer device to:

obtain a first query request, the first query request carrying the first user identifier of the user and an organization identifier of an organization initiating a query; and obtain the credit data of the first user identifier from the second block chain according to the first user identifier of the user in response to determining that the organization has a query permission.

18. The computer device according to claim 13, wherein the processor, when executing the computer readable instructions, is further configured to cause the computer device to:

correspondingly store behavioral information of the user and a second user identifier of the user into a fourth block chain, the fourth block chain being configured to store behavioral information of the user on each server.

19. The computer device according to claim 18, wherein the processor, when executing the computer readable instructions, is further configured to cause the computer device to:

obtain a first query request, the first query request carrying the second user identifier of the user in the organization; and obtain behavioral information corresponding to the second user identifier from the fourth block chain according to the second user identifier.

20. A non-transitory storage medium for storing computer readable instructions, the computer readable instructions, when executed by a processor, causing the processor to:

obtain, according to user information of a user, a first user identifier of the user from a first block chain, the first block chain being configured to store user information of a user and a corresponding first user identifier, wherein the user is in one organization of a plurality of organizations, and the first user identifier uniquely identifies the user across the plurality of organizations;

encrypt newly-added behavioral data of the user based on a secret key;

store the encrypted newly-added behavioral data of the user to a private block chain;

generate credit data of the first user identifier according to the user information of the user, newly-added behavioral data of the user, and historical credit data of the first user identifier stored on a second block chain, the second block chain being configured to store credit data provided by a plurality of organizations;

transmit the credit data of the first user identifier to a target node of the second block chain;

obtain a target block in a case that a received response meets a target policy, the target block being configured to store the credit data of the first user identifier add the target block in the second block chain; and award n query points to the one organization, wherein the n query points are used for a future credit query, n is a positive integer based on the credit data.

* * * * *